(12) United States Patent
Kendall

(10) Patent No.: US 8,134,648 B2
(45) Date of Patent: Mar. 13, 2012

(54) METHOD FOR ENABLING USER CONTROL OF AN APPARATUS

(75) Inventor: Scott Allan Kendall, Westfield, IN (US)

(73) Assignee: Thomson Licensing, Boulogne Billancourt (FR)

( * ) Notice: Subject to any disclaimer, the term of this patent is extended or adjusted under 35 U.S.C. 154(b) by 1253 days.

(21) Appl. No.: 11/883,491

(22) PCT Filed: Feb. 7, 2005

(86) PCT No.: PCT/US2005/003470
§ 371 (c)(1),
(2), (4) Date: Aug. 1, 2007

(87) PCT Pub. No.: WO2006/085850
PCT Pub. Date: Aug. 17, 2006

(65) Prior Publication Data
US 2010/0141851 A1    Jun. 10, 2010

(51) Int. Cl.
*H04N 5/44* (2006.01)
*G09G 5/00* (2006.01)
*G08B 6/00* (2006.01)
*G09B 21/00* (2006.01)
*H04B 3/36* (2006.01)

(52) U.S. Cl. ............ 348/734; 345/156; 340/407.2
(58) Field of Classification Search ............. None
See application file for complete search history.

(56) References Cited

U.S. PATENT DOCUMENTS

| 5,408,275 | A | 4/1995 | Song et al. |
| 5,589,893 | A * | 12/1996 | Gaughan et al. ............... 725/37 |
| 7,298,311 | B2 * | 11/2007 | Horie et al. ............... 341/176 |
| 2002/0019981 | A1 | 2/2002 | Schein et al. |
| 2002/0093490 | A1 | 7/2002 | Lee |
| 2004/0250278 | A1 | 12/2004 | Imai |

FOREIGN PATENT DOCUMENTS

| CN | 1082798 A | 2/1994 |
| CN | 1550101 A | 11/2004 |
| EP | 0451872 A2 | 4/1991 |
| EP | 1394666 A1 | 5/2002 |
| KR | 2001-0083928 | 9/2001 |
| KR | 2003-0051665 | 6/2003 |
| WO | WO03/036455 A1 | 5/2003 |

OTHER PUBLICATIONS

Patent Abstracts of Japan, vol. 2003, No. 05. May 12, 2003 & JP 2003 032509 A (Sony Corp). Jan. 31, 2003 abstract.
Patent Abstracts of Japan, vol. 2000, No. 03, Mar. 30, 2000 & JP 11 338622 A (Matsushita Electric Ind Co Ltd), Dec. 10, 1999 abstract).

* cited by examiner

*Primary Examiner* — Mark D Featherstone
(74) *Attorney, Agent, or Firm* — Robert D. Shedd; Joseph J. Opalach; Reitseng Lin

(57) ABSTRACT

A method is provided for enabling users to control various functions of an apparatus such as a television signal receiver in an easy and convenient manner. According to an exemplary embodiment, the method enables a user to control an apparatus via a user input device having a key capable of being rotated and pressed by the user. The method includes steps of enabling the user to control a first set of functions of the apparatus during a first mode by rotating and pressing the key responsive to an on-screen menu, and enabling the user to control a second set of functions of the apparatus during a second mode by rotating and pressing the key without providing the on-screen menu.

10 Claims, 5 Drawing Sheets

METHOD FOR ENABLING USER CONTROL OF AN APPARATUS

BACKGROUND OF THE INVENTION

1. Field of the Invention

This application claims the benefit, under 35 U.S.C. §365 of International Application PCT/US2005/003470, filed Feb. 7, 2005, which was published in accordance with PCT Article 21(2) on WO2006/085850 A1 in English.

The present invention generally relates to user control techniques for an apparatus, and more particularly, to a method for enabling users to control various functions of an apparatus such as a television signal receiver in an easy and convenient manner.

2. Background Information

Apparatuses such as television signal receivers are often controllable by user input devices such as hand-held, wireless remote control devices and/or other user input devices. Current designs for such user input devices often include a relatively large number of keys/buttons to accommodate the many functions capable of being is provided by the apparatus. Such designs may, for example, include specific keys/buttons that are dedicated to controlling certain apparatus functions.

With the aforementioned type of user input device designs, it may be unduly complicated for users to control an apparatus. For example, users may become overwhelmed by the relatively large number of keys/buttons available for selection and/or may not understand the function provided by certain keys/buttons. Accordingly, users may avoid using many of the available keys/buttons of the user input device, other than those keys/buttons that they understand and are comfortable using and/or those keys/buttons that are necessary for the basic operation and control of an apparatus (e.g., on/off, etc.). As a result, users may be disadvantaged in that they fail to utilize the many available functions capable of being provided by an apparatus.

Accordingly, there is a need for a method for enabling users to control an apparatus such as a television signal receiver that avoids the foregoing problems, and thereby enables users to control a relatively large number of apparatus functions in an easy and convenient manner. The present invention addresses these and/or other issues.

SUMMARY OF THE INVENTION

In accordance with an aspect of the present invention, a method for enabling a user to control an apparatus via a user input device having a key capable of being rotated and pressed by the user is disclosed. According to an exemplary embodiment, the method comprises steps of enabling the user to control a first set of functions of the apparatus during a first mode by rotating and pressing the key responsive to an on-screen menu, and enabling the user to control a second set of functions of the apparatus during a second mode by rotating and pressing the key without providing the on-screen menu.

In accordance with another aspect of the present invention, an apparatus capable of being controlled by a user via a user input device having a key capable of being rotated and pressed by the user is disclosed. According to an exemplary is embodiment, the apparatus comprises memory means for storing data that enables an on-screen menu. The apparatus further comprises processing means for enabling the user to control a first set of functions of the apparatus during a first mode by rotating and pressing the key responsive to the on-screen menu, and for enabling the user to control a second set of functions of the apparatus during a second mode by rotating and pressing the key without providing the on-screen menu.

In accordance with yet another aspect of the present invention, a television signal receiver capable of being controlled by a user via a user input device having a key capable of being rotated and pressed by the user is disclosed. According to an exemplary embodiment, the television signal receiver comprises a memory operative to store data that enables an on-screen menu having a plurality of rows and columns of selectable icons. The television signal receiver further comprises a processor operative to enable the user to control a first set of functions of the television signal receiver during a first mode by rotating and pressing the key responsive to the on-screen menu. The key is capable of being rotated in a plurality of directions by the user and includes a plurality of sections capable of being pressed by the user. The user moves a highlighted cursor within the on-screen menu between the rows by rotating the key and selects one of the selectable icons by pressing a given section of the key.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
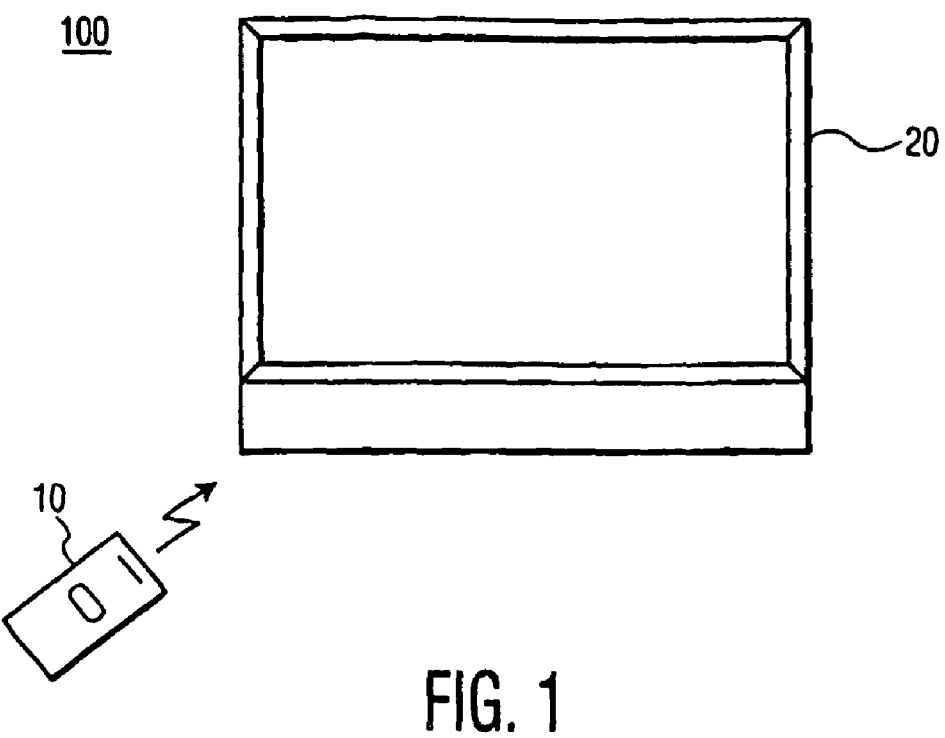
FIG. 1 is an exemplary environment suitable for implementing the present invention.

Referring now to the drawings, and more particularly to FIG. 1, an exemplary environment 100 suitable for implementing the present invention is shown. As indicated in FIG. 1, environment 100 comprises input device 10, and an apparatus 20. According to an exemplary embodiment, user input device 10 is embodied as a hand-held, wireless remote control device, but could also be embodied, as a wired and/or wireless keyboard, integrated control panel of apparatus 20, and/or other user input device. Also according to an exemplary embodiment, apparatus 20 is embodied as a television signal receiver having an integrated display device, but could also be embodied as another type of apparatus or device including one that does not include an integrated display device (e.g., set-top box, etc.). Further exemplary details regarding user input device 10 and apparatus 20 will be provided later herein.

Figure 2:
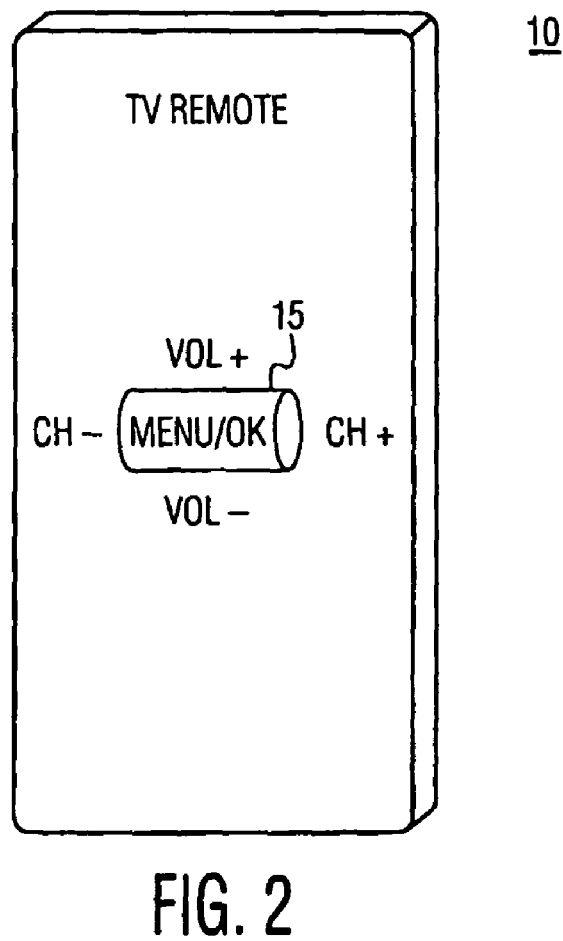
FIG. 2 is a diagram providing further details of the user input device of FIG. 1 according to an exemplary embodiment of the present invention.

Referring to FIG. 2, a diagram providing further details of user input device 10 of FIG. 1 according to an exemplary embodiment of the present invention is shown. User input device 10 of FIG. 2 comprises a control key 15 that may be manipulated by users to control various functions of apparatus 20 and/or other devices. User input device 10 may also include one or more other keys/buttons and/or other control mechanisms in addition to control key 15. According to an exemplary embodiment, user input device 10 is operative to generate and output control signals in a wired and/or wireless (e.g., via infrared or radio frequency (RF) link, etc.) manner responsive to user rotation and/or depression of control key 15 to thereby control various functions of apparatus 20 and/or other devices. Control key 15 may, for example, be embodied as a Barrel Key™ produced by Telenostra, or a similar type of control mechanism.

Figure 3:
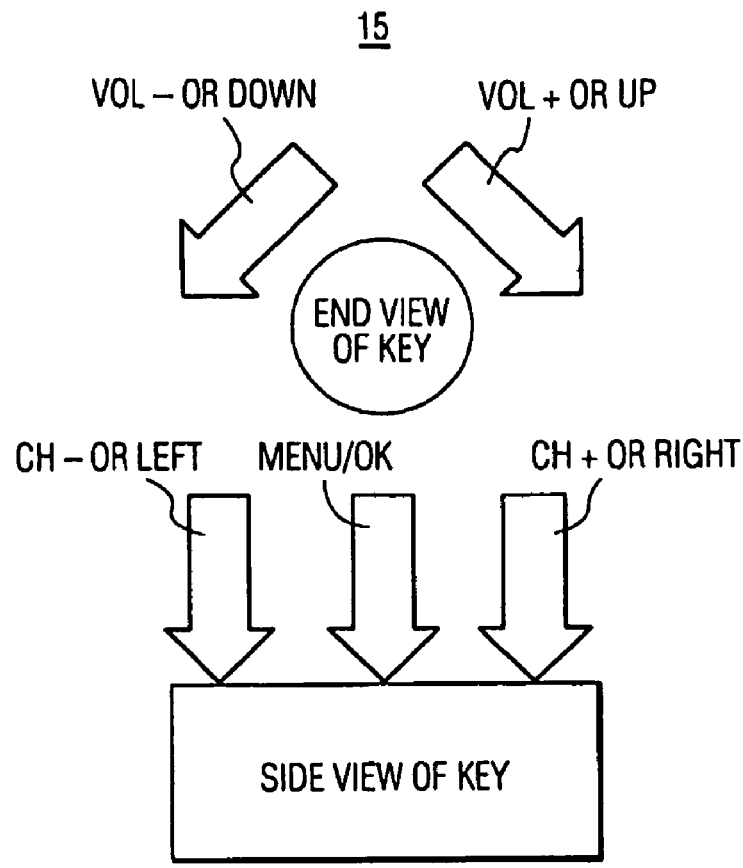
FIG. 3 is a diagram providing further details of the control key of FIG. 2 according to an exemplary embodiment of the present invention.

Referring to FIG. 3, a diagram providing further details of control key 15 of FIG. 2 according to an exemplary embodiment of the present invention is shown. In particular, FIG. 3 provides an end view and a side view of control key 15 and illustrates how control key 15 may be manipulated by users to control certain functions of apparatus 20 and/or other devices according to an exemplary embodiment of the present invention. As indicated in FIG. 3, control key 15 may be rotated in first and second directions (i.e., clockwise and counterclockwise), and includes three sections (i.e., right side, center, left side) that may be pressed by users.

According to an exemplary embodiment, control key 15 may be used during a first mode to control a first set of functions of apparatus 20, and may also be used during a second mode to control a second set of functions of apparatus 20. During the first mode, control key 15 may be used to navigate within an on-screen menu comprised of a plurality of rows and columns of user selectable icons, and to select a particular icon in the menu and thereby control a particular function of apparatus 20. According to an exemplary embodiment, control key 15 may be rotated in a first (e.g., clockwise or upward) direction to move a highlighted cursor in an upward direction between rows in the on-screen menu, and may be rotated in a second (e.g., counterclockwise or downward) direction to move the highlighted cursor in a downward direction between rows in the on-screen menu. Once a desired row of icons is highlighted by the cursor, the user may then select a particular icon within that highlighted row by pressing a corresponding section of control key 15.

Additionally, control key 15 may be used during the second mode to control other functions of apparatus 20 without the aid of an on-screen menu. According to an exemplary embodiment, control key 15 may be rotated in the first direction during is the second mode to increase the volume of apparatus 20, and may be rotated in the second direction during the second mode to decrease the volume of apparatus 20. Also during the second mode, the right side section of control key 15 may be pressed to increase the channel tuned by apparatus 20, and the left side section of control key 15 may be pressed to decrease the channel tuned by apparatus 20. Pressing the center section of control key 15 during the second mode causes the on-screen menu to be displayed, and thereby switches apparatus 20 from the second mode to the first mode.

In the above-described manner, control key 15 advantageously enables users to control various functions of apparatus 20 using an on-screen menu during the first mode, and without the aid of an on-screen menu during the second mode. Further exemplary details regarding the use of control key 15 during the first and second modes will be provided later herein.

Figure 4:
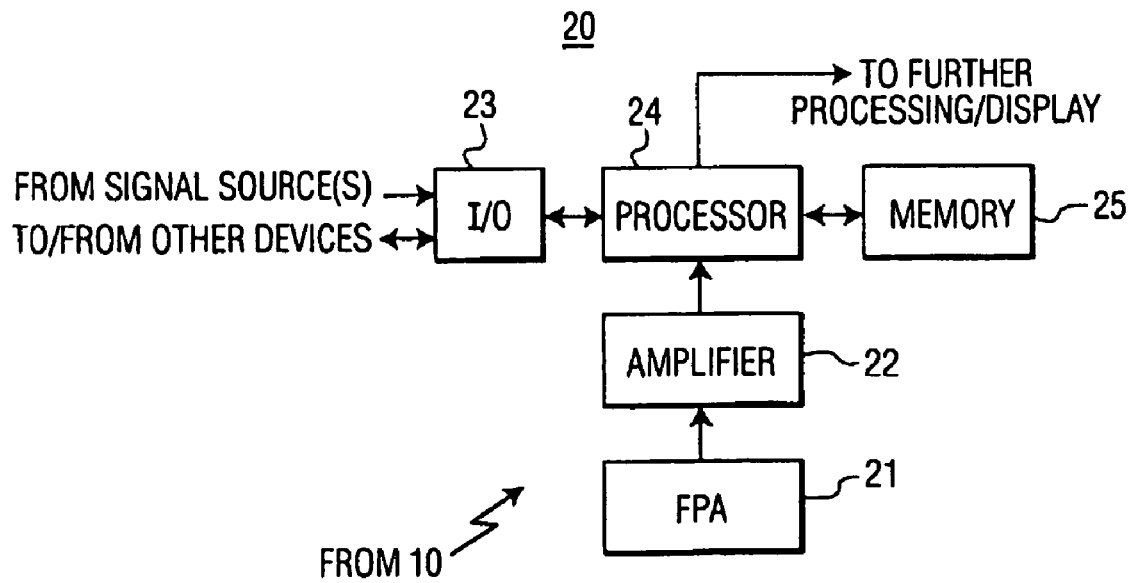
FIG. 4 is a diagram providing further details of the apparatus of FIG. 1 according to an exemplary embodiment of the present invention.

Referring to FIG. 4, a diagram providing further details of apparatus 20 of FIG. 1 according to an exemplary embodiment of the present invention is shown. Apparatus 20 of FIG. 4 comprises front panel means such as front panel assembly (FPA) 21, amplifying means such as amplifier 22, and input/output (I/O) means such as I/O block 23, processing means such as processor 24, and memory means such as memory 25. Some of the foregoing elements of FIG. 4 may be embodied using ICs, and some elements may for example be included on one or more ICs. For clarity of description, certain conventional elements associated with apparatus 20 such as certain control signals, power signals and/or other elements may not be shown in FIG. 4.

FPA 21 is operative to receive user inputs from user input device 10, and to output signals corresponding to the user inputs to amplifier 22. According to an exemplary embodiment, FPA 21 receives signals, such as IR and/or RF signals, from user input device 10 and generates corresponding signals which are output to amplifier 22. Amplifier 22 is operative to amplify the signals provided from FPA 21 for output to processor 24.

I/O block 23 is operative to perform I/O functions of apparatus 20. According to an exemplary embodiment, I/O block 23 is operative to receive signals such as audio, video and/or data signals in analog and/or digital modulation format from one or more signal sources such as terrestrial, cable, satellite, Internet and/or other signal sources. I/O block 23 is also operative to output processed signals to one or more other devices, and to receive signals from such devices.

Processor 24 is operative to perform various signal processing and control functions of apparatus 20. According to an exemplary embodiment, processor 24 processes the audio, video and/or data signals provided from I/O block 23 by performing functions including tuning, demodulation, forward error correction, and transport processing functions to thereby generate digital data representing audio, video and/or data content. The digital data produced from such processing functions may be provided for further processing (e.g., MPEG decoding, etc.) and output.

Processor 24 is also operative to execute software code that enables users to control apparatus 20 and/or other devices via control key 15 of user input device 10. According to an exemplary embodiment, processor 24 detects and processes user inputs provided via control key 15 of user input device 10, and may control its own operations and/or output control signals to control other elements of apparatus 20 (including elements not shown in FIG. 4) responsive to such user inputs. Processor 24 is also operative to perform and/or enable other functions of apparatus 20 such as, but not limited to, enabling OSD menus for user setup and control of apparatus 20, reading and writing data from and to memory 25, and/or other functions.

Memory 25 is operative to perform data storage functions of apparatus 20. According to an exemplary embodiment, memory 25 stores data including, but not limited to, software code, OSD menu data, user setup data, and/or other data.

Figure 5:
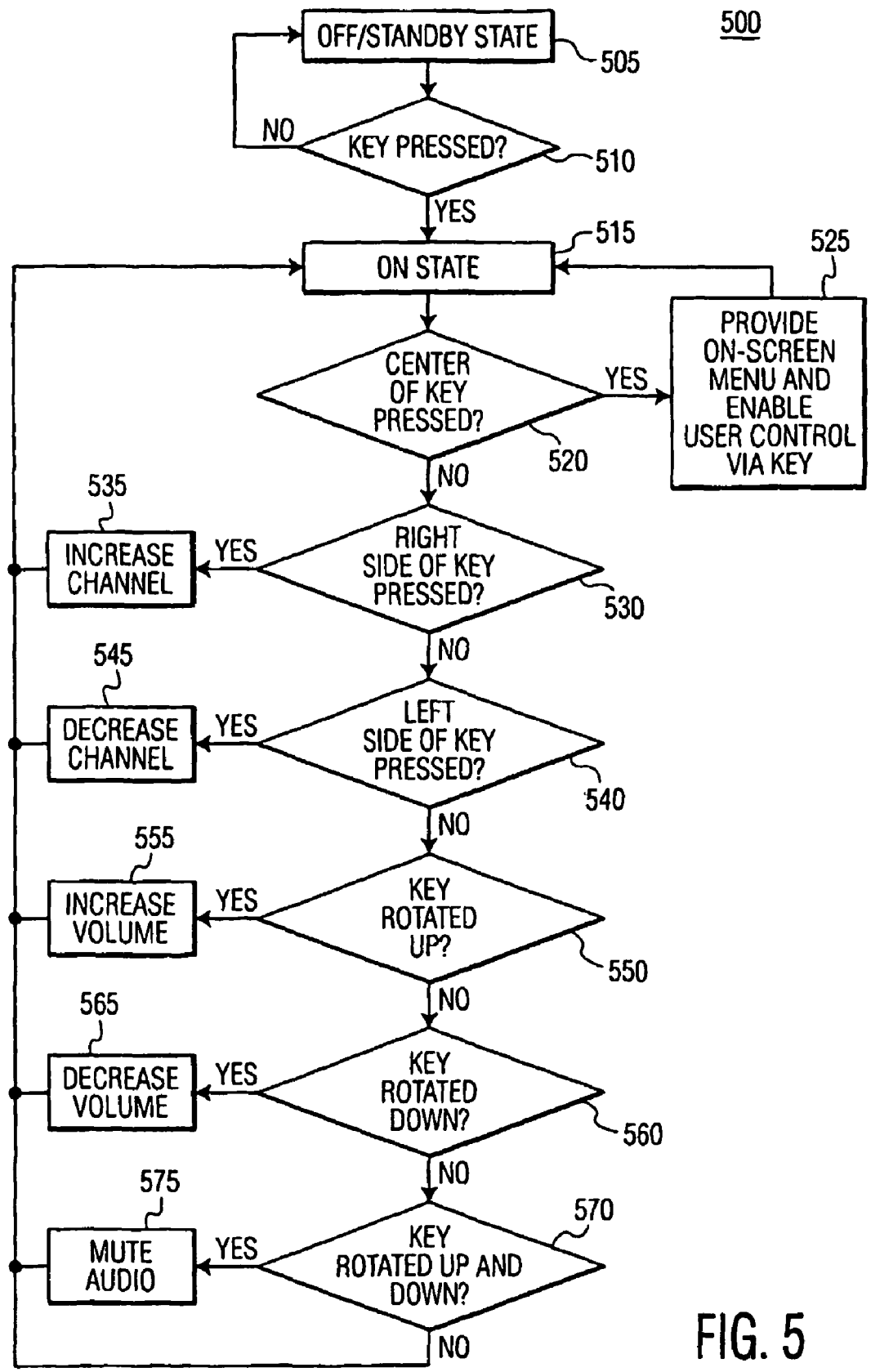
FIG. 5 is a flowchart illustrating steps according to an exemplary embodiment of the present invention.

To facilitate a better understanding of the present invention, an example will now be provided. Referring to FIG. 5, a flowchart 500 illustrating steps according to an exemplary embodiment of the present invention is shown. For purposes of example and explanation, the steps of FIG. 5 will be described with reference to user input device 10 and apparatus 20 as previously described herein. The steps of FIG. 5 are merely exemplary, and are not intended to limit the present invention in any manner.

At step 505, apparatus 20 is in an off/standby state. According to an exemplary embodiment, the off/standby state represents an operational state in which apparatus 20 receives electrical power (e.g., is plugged into a power source), but is switched off.

At step 510, a determination is made as to whether any section of control key 15 of user input device 10 is pressed by a user. According to an exemplary embodiment, processor 24 detects user depression of any section of control key 15 at step 510. If the determination at step 510 is negative, process flow loops back to step 505 where apparatus 20 remains in the off/standby state. Alternatively, if the determination at step 510 is positive, process flow advances to step 515 where apparatus 20 is switched to the on state. According to an exemplary embodiment, processor 24 outputs one or more control signals to thereby switch apparatus 20 from the off/standby state to the on state at step 515.

At step 520, a determination is made as to whether the center section of control key 15 is pressed by the user. According to an exemplary embodiment, processor 24 detects any user depression of the center section of control key 15 at step 520. If the determination at step 520 is positive, process flow advances to step 525 where apparatus 20 provides an on-screen menu and enables the user to control apparatus 20 via control key 15 of user input device 10 under the control of processor 24. A positive determination at step 520 indicates that apparatus 20 has switched from the second mode to the first mode, as previously described herein.

Figure 6:
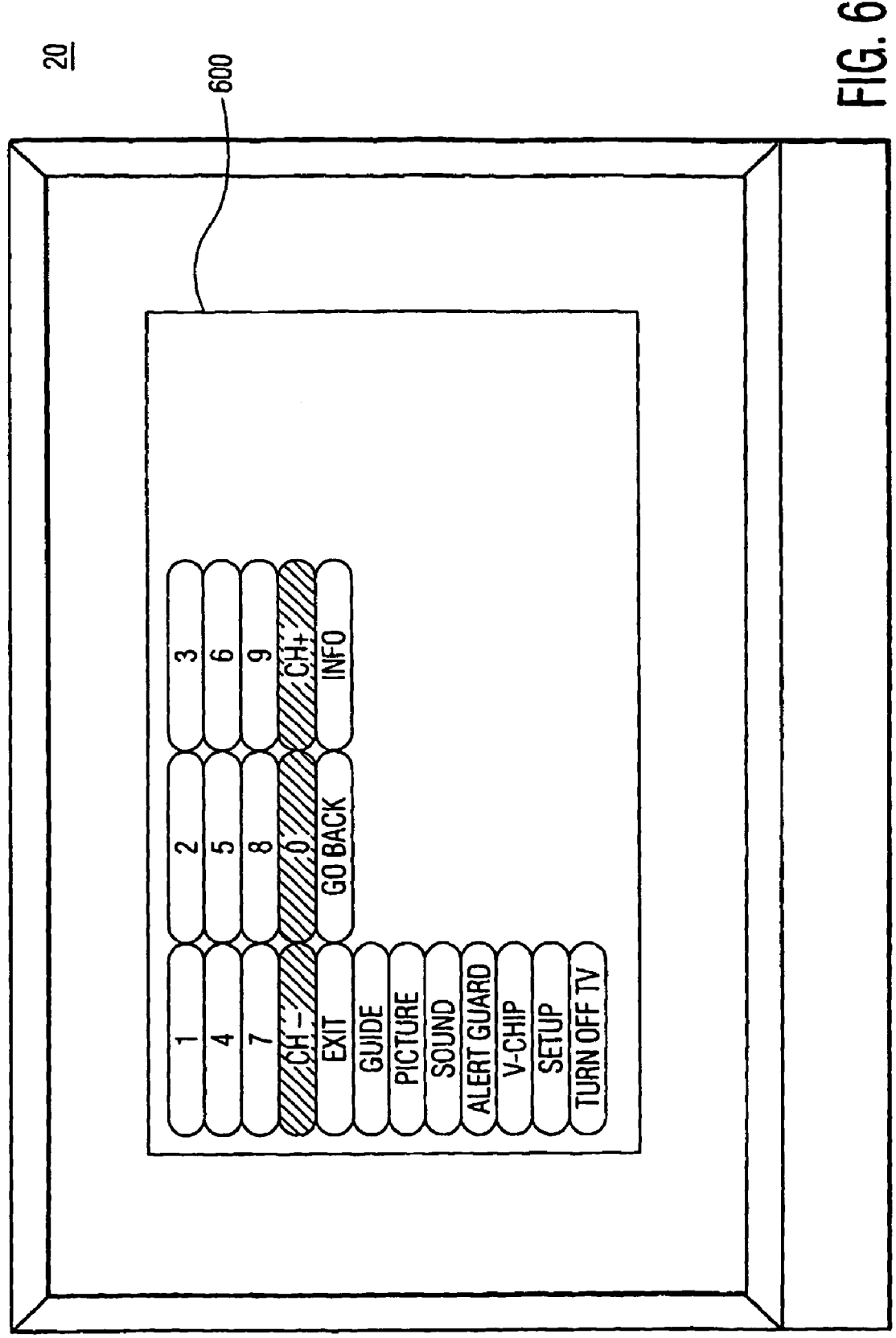
FIG. 6 is an on-screen menu according to an exemplary embodiment of the present invention.
Figure 7:
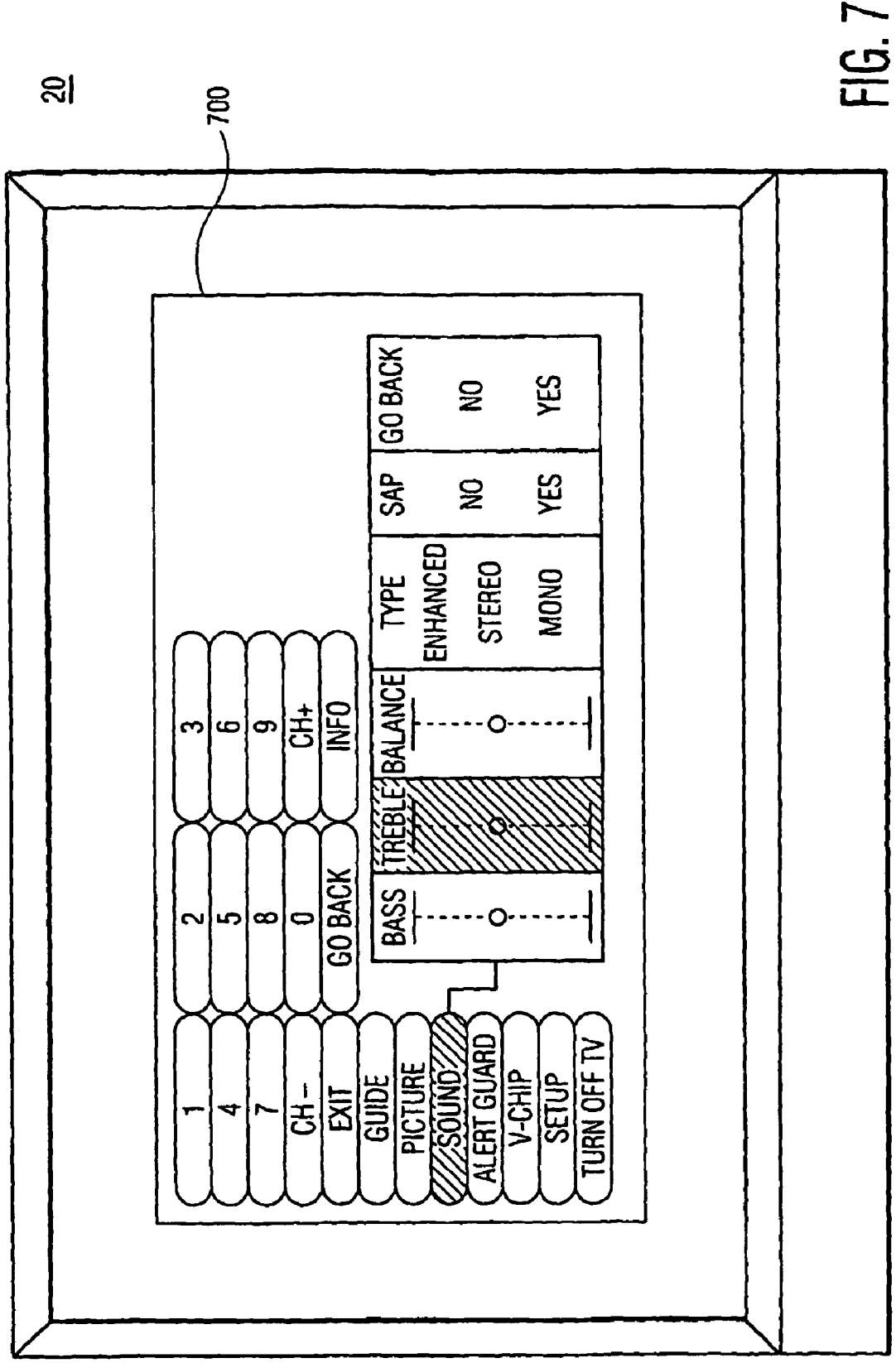
FIG. 7 is another on-screen menu according to an exemplary embodiment of the present invention.

Examples of the on-screen menu provided at step 525 are shown in FIGS. 6 and 7. As shown in FIGS. 6 and 7, respectively, on-screen menus 600 and 700 each include a plurality of rows and columns of user selectable icons. In FIG. 6, for example, the fourth row of such icons in on-screen menu 600 is highlighted by an on-screen cursor that may be moved upwardly and/or downwardly on a row-by-row basis by user rotation of control key 15. As previously indicated herein, a user may rotate control key 15 in a first (e.g., clockwise or upward) direction to move the highlighted cursor in an upward direction between rows in on-screen menu 600, and conversely, may rotate control key 15 in a second (e.g., counterclockwise or downward) direction to move the highlighted cursor in a downward direction between rows in on-screen menu 600. Once a desired row of icons is highlighted by the cursor, the user may then select a particular icon within that highlighted row by pressing a corresponding section of control key 15. In FIG. 6, for example, while the fourth row of icons is highlighted, a user may: (i) press the right side of control key 15 to increase the channel to which apparatus 20 is currently tuned, (ii) press the left side of control key 15 to decrease the channel to which apparatus 20 is currently tuned, or (iii) press the center section of control key 15 to enter the channel digit "0."

As another example, to enter channel "15" in FIG. 6, the user would rotate control key 15 in the first (e.g., clockwise or upward) direction to move the highlighted cursor up three rows to the top row of icons. Once the top row of icons is highlighted by the on-screen cursor, the user would press the left side of control key 15 to enter channel digit "1." The user would then rotate control key 15 in the second (e.g., counterclockwise or downward) direction to move the highlighted cursor down one row to the second row of icons. Once the second row of icons is highlighted by the on-screen cursor, the user would press the center section of control key 15 to enter channel digit "5" and thereby enter channel "15." To exit the on-screen menu 600 of FIG. 6 at step 525, the user may wait several seconds for the on-screen menu to "time-out" and disappear, or rotate control key 15 in the second (e.g., counterclockwise or downward) direction to move the highlighted cursor down to the fifth row of icons, and then press the left side of control key 15 to thereby select the "Exit" icon.

On-screen menu 700 of FIG. 7 illustrates an expanded menu under the "Sound" icon of FIG. 6. To generate the expanded on-screen menu 700 of FIG. 7, a user would rotate control key 15 in the second (e.g., counterclockwise or downward) direction to move the highlighted cursor down to the "Sound" icon. Once the "Sound" icon is highlighted by the cursor, the user would press, any section (i.e., right side, left side, or center) of control key 15 to display the expanded "Sound" menu shown in FIG. 7. Once, the expanded "Sound" menu is displayed, each depression of the right side of control key 15 would move the highlighted cursor to the right by one icon. Accordingly, if the user pressed the right side of control key 15 two times, the highlighted cursor would move two icons to the right and highlight the "Treble" icon, as shown in FIG. 7. The user could then adjust the "Treble" level upwardly and downwardly by rotating control key 15 in the upwardly and downwardly, respectively. Other icons of FIGS. 6 and 7 may be adjusted in a like manner. To exit the expanded "Sound" menu of FIG. 7, the user would press the left side of control key 15 while the "Bass" icon is highlighted.

Referring back to FIG. 5, if the determination at step 520 is negative, process flow advances to step 530 where apparatus 20 remains in the second mode and a determination is made as to whether the right side of control key 15 is pressed by the user. According to an exemplary embodiment, processor 24 detects any user depression of the right side of control key 15 at step 530. If the determination at step 530 is positive, process flow advances to step 535 where apparatus 20 increases the channel to which it is currently tuned. According to an exemplary embodiment, processor 24 controls its tuning function to thereby effectuate the channel increase at step 535. From step 535, process flow loops back to step 515 where apparatus 20 remains in the on state.

Alternatively, if the determination at step 530 is negative, process flow advances to step 540 where a determination is made as to whether the left side of control key 15 is pressed by the user. According to an exemplary embodiment, processor 24 detects any user depression of the left side of control key 15 at step 540. If the determination at step 540 is positive, process flow advances to step 545 where apparatus 20 decreases the channel to which it is currently tuned. According to an exemplary embodiment, processor 24 controls its tuning function to thereby effectuate the channel decrease at step 545. From step 545, process flow loops back to step 515 where apparatus 20 remains in the on state.

Alternatively, if the determination at step 540 is negative, process flow advances to step 550 where a determination is made as to whether control key 15 is rotated upwardly by the user. According to an exemplary embodiment, processor 24 detects any upward rotation of control key 15 by a user at step 550. If the determination at step 550 is positive, process flow advances to step 555 where apparatus 20 increases the volume. According to an exemplary embodiment, processor 24 outputs one or more control signals to audio control circuitry (not shown in FIG. 4) of apparatus 20 to thereby effectuate the volume increase at step 555. From step 555, process flow loops back to step 515 where apparatus 20 remains in the on state.

Alternatively, if the determination at step 550 is negative, process flow advances to step 560 where a determination is made as to whether control key 15 is rotated downwardly by the user. According to an exemplary embodiment, processor 24 detects any downward rotation of control key 15 by a user at step 560. If the determination at step 560 is positive, process flow advances to step 565 where apparatus 20 decreases the volume. According to an exemplary embodiment, processor 24 outputs one or more control signals to audio control circuitry (not shown in FIG. 4) of apparatus 20 to thereby effectuate the volume decrease at step 565. From step 565, process flow loops back to step 515 where apparatus 20 remains in the on state.

Alternatively, if the determination at step 560 is negative, process flow advances to step 570 where a determination is made as to whether control key 15 is rotated both upwardly and downwardly by the user within a predetermined time period. According to an exemplary embodiment, processor 24 detects whether control key 15 has been rotated upwardly and downwardly by a user within the predetermined time period at step 570. If the determination at step 570 is negative, process flow loops back to step 515 where apparatus 20 remains in the on state. Alternatively, if the determination at step 570 is positive, process flow advances to step 575 where apparatus 20 mutes its audio outputs. According to an exemplary embodiment, processor 24 outputs one or more control signals to audio control circuitry (not shown in FIG. 4) of apparatus 20 to thereby effectuate the audio muting function at step 575. Other ways of activating the audio muting function may also be performed according to the present invention. For example, the audio muting function could be activated if control key 15 is rotated downwardly a predetermined distance within a predetermined time period (i.e., a fast downward rotation). Once the audio muting function is activated, an upward rotation of control key 15 could then inactivate the audio muting function and thereby restore audio outputs. From step 575, process flow loops back to step 515 where apparatus 20 remains in the on state.

As described herein, the present invention provides a method for enabling users to control various functions of an apparatus such as a television signal receiver in an easy and convenient manner. The present invention may be applicable to various apparatuses, either with or without an integrated display device. Accordingly, the phrase "television signal receiver" as used herein may refer to systems or apparatuses including, but not limited to, television sets, computers or monitors that include an integrated display device, and systems or apparatuses such as set-top boxes, video cassette recorders (VCRs), digital versatile disk (DVD) players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for enabling a user to control an apparatus via a user input device having a key capable of being rotated and pressed by said user, said method comprising steps of:

enabling said user to control a first set of functions of said apparatus during a first mode by rotating and pressing said key responsive to an on-screen menu; and enabling said user to control a second set of functions of said apparatus during a second mode by rotating and pressing said key without providing said on-screen menu, wherein said second set of functions includes a volume adjustment function, a channel adjustment function, and a muting function, and wherein during said second mode:

said user rotates said key in a first direction to increase a volume;

said user rotates said key in a second direction to decrease said volume;

said user presses a first section of said key to increase a channel; and said user presses a second section of said key to decrease said channel; and said user rotates said key in said first direction and in said second direction within a predetermined time period to activate said audio muting function.

2. The method of claim 1, wherein:

said key includes a plurality of sections capable of being pressed by said user; and said on-screen menu is displayed responsive to said user pressing a first section of said key.

3. The method of claim 1, wherein:

said key is capable of being rotated in a plurality of directions by said user;

said key includes a plurality of sections capable of being pressed by said user;

said user navigates through said on-screen menu during said first mode by rotating said key; and said user selects one of said first set of functions to be controlled during said first mode by pressing a given section of said key.

4. The method of claim 1, wherein:

said key is capable of being rotated in two directions by said user;

said key includes three sections capable of being pressed by said user;

said on-screen menu includes at least two rows and three columns of selectable icons;

said user moves a highlighted cursor between said rows during said first mode by rotating said key; and said user selects one of said selectable icons during said first mode by pressing one of said three sections of said key.

5. An apparatus capable of being controlled by a user via a user input device having a key capable of being rotated and pressed by said user, said apparatus comprising:

memory means for storing data that enables an on-screen menu; and processing means for enabling said user to control a first set of functions of said apparatus during a first mode by rotating and pressing said key responsive to said on-screen menu, and enabling said user to control a second set of functions of said apparatus during a second mode by rotating and pressing said key without providing said on-screen menu, wherein said second set of functions includes a volume adjustment function, a channel adjustment function, and a muting function, and wherein during said second mode:

said user rotates said key in a first direction to increase a volume;

said user rotates said key in a second direction to decrease said volume;

said user presses a first section of said key to increase a channel; and said user presses a second section of said key to decrease said channel; and said user rotates said key in said first direction and in said second direction within a predetermined time period to activate said audio muting function.

6. The apparatus of claim 5, wherein:

said key includes a plurality of sections capable of being pressed by said user; and said on-screen menu is displayed responsive to said user pressing a first section of said key.

7. The apparatus of claim 5, wherein:

said key is capable of being rotated in a plurality of directions by said user;

said key includes a plurality of sections capable of being pressed by said user;

said user navigates through said on-screen menu during said first mode by rotating said key; and said user selects one of said first set of functions to be controlled during said first mode by pressing a given section of said key.

8. The apparatus of claim 5, wherein:

said key is capable of being rotated in two directions by said user;

said key includes three sections capable of being pressed by said user;

said on-screen menu includes at least two rows and three columns of selectable icons;

said user moves a highlighted cursor between said rows during said first mode by rotating said key; and said user selects one of said selectable icons during said first mode by pressing one of said three sections of said key.

9. A television signal receiver capable of being controlled by a user via a user input device having a key capable of being rotated and pressed by said user, said television signal receiver comprising:

a memory operative to store data that enables an on-screen menu having a plurality of rows and columns of selectable icons;

a processor operative to enable said user to control a first set of functions of said television signal receiver during a first mode by rotating and pressing said key responsive to said on-screen menu;

wherein said key is capable of being rotated in a plurality of directions by said user and includes a plurality of sections capable of being pressed by said user; and wherein said user moves a highlighted cursor within said on-screen menu between said rows by rotating said key and selects one of said selectable icons by pressing a given section of said key, wherein said processor is further operative to enable said user to control a second set of functions of said television signal receiver during a second mode by rotating and pressing said key without providing said on-screen menu;

wherein said second set of functions includes a volume adjustment function, a channel adjustment function, and a muting function, and wherein during said second mode:

said user rotates said key in a first direction to increase a volume;

said user rotates said key in a second direction to decrease said volume;

said user presses a first section of said key to increase a channel; and said user presses a second section of said key to decrease said channel; and said user rotates said key in said first direction and in said second direction within a predetermined time period to activate said audio muting function.

10. The television signal receiver of claim 9, wherein said on-screen menu is displayed responsive to said user pressing a predetermined section of said key.

\* \* \* \* \*